Figure 2:
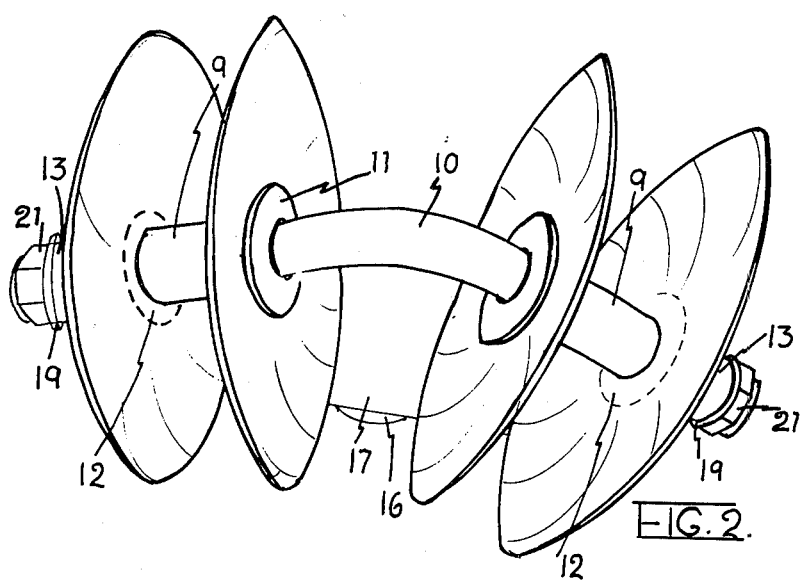

United States Patent [19]

Boyd-Dunlop

[11] 4,072,197
[45] Feb. 7, 1978

[54] DISC CULTIVATOR WITH CURVED SPACER STRUCTURE

[76] Inventor: Percy Boyd-Dunlop, Seafield, R.D. 1, Howick, Auckland, New Zealand

[21] Appl. No.: 693,079

[22] Filed: June 4, 1976

[30] Foreign Application Priority Data

June 13, 1975 New Zealand .......................... 177822

[51] Int. Cl.² .............................................. A01B 1/10
[52] U.S. Cl. ..................................... 172/349; 172/574
[58] Field of Search ................... 172/15, 16, 178, 349, 172/350, 371, 531, 574, 575, 604, 567, 577, 579

[56] References Cited

U.S. PATENT DOCUMENTS

| | | | |
|---|---|---|---|
| 396,895 | 1/1889 | Rose | 172/567 |
| 633,465 | 9/1899 | Mertes | 172/349 |
| 805,252 | 11/1905 | Winters | 172/349 |
| 1,024,345 | 4/1912 | Langley | 172/574 |
| 1,112,046 | 9/1914 | Zentz | 172/178 |
| 3,640,347 | 2/1972 | Miller | 172/349 |

FOREIGN PATENT DOCUMENTS

| | | | |
|---|---|---|---|
| 750,748 | 6/1933 | France | 172/574 |
| 301,207 | 11/1928 | United Kingdom | 172/574 |
| 809,226 | 2/1959 | United Kingdom | 172/350 |

Primary Examiner—Richard T. Stouffer
Attorney, Agent, or Firm—Ladas, Parry, Von Gehr, Goldsmith & Deschamps

[57] ABSTRACT

A cultivator comprises a handle at one end of which is a plurality of dished discs, the dishing of the discs being opposed about a center point. The shaft on which the discs are mounted is bent through an angle at substantially a mid point such that by running the discs through soil, the discs cultivate the soil. The discs are mounted in two groups of two discs each. The groups are separated from each other by a curved spacer mounted on the shaft over the angled portion thereof.

6 Claims, 4 Drawing Figures

DISC CULTIVATOR WITH CURVED SPACER STRUCTURE

This invention relates to cultivators.

It has been thought desirable to provide a cultivator which can be operated by hand and used to cultivate, for example, around vegetables and other small plants in a garden.

It is therefore an object of the present invention to provide a cultivator which will go at least some distance towards meeting the foregoing desiderata in a simple yet effective manner, or which will at least provide the public with a useful choice.

Accordingly the invention consists in a cultivator comprising a handle, a plurality of discs provided in two groups, there being at least one disc in each group, a shaft or shafts on which said discs are mounted, said shaft being angled at or adjacent a mid point thereof or said shafts being provided at an angle one to the other and said discs being rotatably mounted on said shaft or shafts in a manner such that each part of said shaft or each shaft has a group of discs thereon, and mounting means between said shaft or shafts and said handle.

To those skilled in the art to which this invention relates, many changes in construction and widely differing embodiments and applications of the invention will suggest themselves without departing from the scope of the invention as defined in the appended claims. The disclosures and the description herein are purely illustrative and are not intended to be in any sense limiting.

Figure 1:
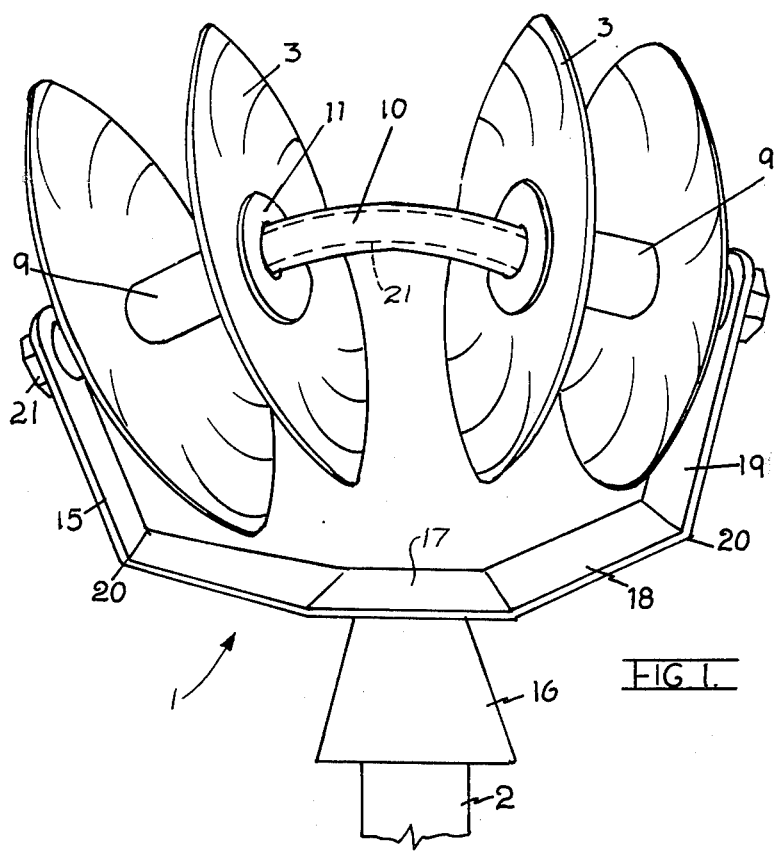
Figure 3:
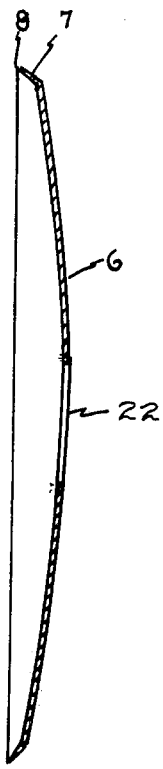
Figure 4:
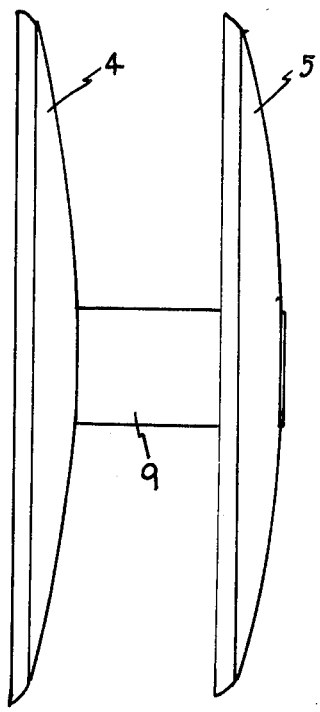

One preferred form of the invention will now be described with reference to the accompanying drawings in which FIG. 1 is a perspective view of a cultivator, according to the invention, FIG. 2 is a front elevation of a cultivator, according to the invention, FIG. 3 is a cross section through a single disc for use in a cultivator according to the invention, and FIG. 4 is a front elevation of a pair of discs for use in a cultivator according to the invention.

In the preferred form of the invention a cultivator 1 is provided which comprises a handle such as a rod, or shaft 2 and a plurality of discs such as discs 3. The discs are mounted on a shaft or shafts not shown and there being provided mounting means between the shaft or shafts and the handle 2.

The mounting means may be in the form of a boss to which the handle is engaged and the shaft may extend from the boss but a more preferable construction is such that a single shaft 21 is provided, the shaft being bent at a mid point to a suitable angle such as an included angle of between 150° and 160°. If two shafts are provided these also are mounted to form a similar angle, one with the other.

The discs are provided in two groups and there is preferably at least one disc in each group and in the preferred embodiment two discs 4 and 5 as shown in FIG. 4 are provided in each group.

One group of discs is provided on each side of the bend in the mid point of the shaft 21.

The discs are preferably curved or dished and, referring to FIG. 3, a disc 6 is provided which is curved along its length, the disc being approximately 4½ inches in diameter and having a depth of dishing of about ⅜ inch, although of course, discs of other sizes and other dishing may be provided as desired. The perimeter of the disc is preferably sharpened by grinding or otherwise removing a portion from the perimeter of the disc on the outer surface thereof to form a flattened part 7 terminating in a point 8. The flattened portion 7 is preferably positioned at an angle of about 45° to the plane containing the perimeter of the disc 6.

The distance apart of the discs such as discs 4 and 5 is maintained by a spacer 9 and preferably the discs 4 and 5 are rigidly mounted on the spacer 9 and to this end an aperture 22 may be provided in the disc, into which the spacer 9 fits. Thus, the spacer 9 may be fitted in aperture 22 by being a squeeze fit or alternatively they may be welded or brazed or otherwise affixed in the apertures 22. The spacer preferably comprises a tube pipe or the like positioned between the discs and is of a length, for example, of about 1⅜ inches.

The spacing of the discs is also further maintained by a further spacer in the form of a bent tube 10 fitted between the groups of discs and this may be positioned for example, by sliding the tube onto the rod or shaft 21 and then bending the rod or shaft with the tube 10 centrally located. In an alternative construction, the rod or shaft may have an enlarged diameter at the part shown as the tube or spacer 10. It is desirable that a washer 11 or the like be provided between the enlarged diameter portion or tube 10 and the adjacent discs at each junction.

A washer 12 is also preferably provided on the outside of each group of discs and a spacer is provided to space the discs from the mounting means and this spacer preferably comprises a nut or the like 13 fitted onto a threaded end of the rod.

The discs are preferably mounted onto the spacers 9 and the spacers 9 mounted onto the shaft in a manner such that the convex faces of the discs are outwardly facing. Where the discs are rigidly fixed to the spacer they will in use rotate together.

In an alternative construction the outer ends of each tube could be threaded and a bolt could then be fitted onto the thread after first fitting a further spacer over the tube and fitting the discs at each end of the spacer and then bolting. Alternatively, the discs could be riveted to the tube or other wise affixed.

The mounting means, could, as previously discussed comprise a boss or the like at the end of the handle but preferably an arched bracket 15 is provided and the arched bracket 15 may have a holding tube 16, preferably tapered, extending therefrom into which the handle 2 is fitted. Thus, the arched bracket 15 may have a central portion 17 affixed to the tube 16 an outwardly extending portion 18 on each side and an arm part 19 outside the part 18. The fold or bend line at 20 between the parts 18 and 19 preferably is not perpendicular to the side edges of the mounting bracket, but angled thereto so that the bent shaft may be readily affixed to the bracket. The shaft may be affixed to the bracket by passing the threaded ends through apertures (not shown) in the bracket and then by bolting a further bolt 21 onto either end of the shaft.

The plane containing the arms of the shaft is preferably set at an angle to the plane generally containing the mounting bracket. This angle is such that when in use the plane containing the shaft lies substantially horizontal whilst the handle is at an attitude such as to enable the device to be confortably used, and for example this angle may be therefore between 30° and 60° and preferably is about 45°.

The construction may be such that the angle may be varied and this may be achieved for example, by loosening the bolt 13 relative to the bolt 21 or vice versa for rotating the shaft such that the angle is varied and then tightening the nuts 13 and 21 again.

The use of the invention in the preferred form is as follows.

It will be assumed that the angle between the shaft or plane containing the shaft and the plane containing the bracket is set to the desired angle but if not it can be varied as above described.

The device is then run through soil and if the device is orientated such that a view such as FIG. 2 is seen, the discs will enter the soil and the motion of the discs through the soil causes a cultivating action to be effected. The soil on a forward stroke of the device is forced against the inner faces of the discs and the rotation of the discs causes the soil to be thrown upwardly and forwardly to aerate and cultivate the soil.

If the construction is turned over the device will effect a slicing motion through the ground if a downward force is applied to the construction.

The cultivating effect is such that a fine tilth may be given to the soil and also any small plants such as weeds will be lifted from the soil.

Thus it can be seen that a cultivator is provided which will allow a fine tilth to be given to the soil over which the cultivator is run, the cultivator being used such that it may be operated simply and easily by hands of the user.

What I claim is:

1. A cultivator comprising:
   an arched bracket;
   a handle connected to the arched bracket at the midpoint thereof and extending away therefrom;
   shaft means extending between the two arms of the bracket, said shaft means comprising two shaft portions joined together at an angle at the midpoint of the shaft means;
   two groups of discs, each group having a plurality of discs therein, the two groups of discs being mounted to rotate about the two shaft portions respectively, each said plurality of discs being mounted rigidly upon a spacer sleeve which maintains the discs of that group in spaced relation, the two spacer sleeves of the two groups being mounted on the two shaft portions respectively, an additional spacer sleeve being provided on the shaft means between each group of discs and the adjacent arm of the arched bracket; and
   a curved spacer provided on the shaft means between the two groups of discs, the curved portion of said spacer being positioned over the angle at the midpoint of the shaft means, said spacer being curved to substantially the same degree and in the same direction as the shaft means is angled, said curved spacer acting to maintain spacing between said groups of discs, said arched bracket constituting the sole connection between the shaft means and the handle.

2. A cultivator as claimed in claim 1 wherein two discs are provided in each group of discs.

3. A cultivator as claimed in claim 1 wherein each said disc is dished and mounted on said shaft means in a manner such that the convex face of said disc is outwardly facing.

4. A cultivator as claimed in any one of the preceding claims wherein said shaft means is affixed to said bracket in a manner such that the plane containing said shaft means is at an angle to the plane containing said bracket.

5. A cultivator as claimed in claim 4 wherein the angle between the plane containing said shaft means and the plane containing said bracket is between 30° and 60°.

6. A cultivator as claimed in claim 4 wherein said angle between the plane containing said shaft means and the plane containing said bracket is substantially 45°.

* * * * *